US009521593B2

(12) United States Patent
Choi-Grogan

(10) Patent No.: US 9,521,593 B2
(45) Date of Patent: *Dec. 13, 2016

(54) SELECTION OF PACKET DATA PROTOCOL CONTEXT FOR HANDOVER FROM CELLULAR NETWORK TO FEMTO CELL

(71) Applicant: AT&T Mobility II LLC, Atlanta, GA (US)

(72) Inventor: Yung Shirley Choi-Grogan, Issaquah, WA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/857,413

(22) Filed: Sep. 17, 2015

(65) Prior Publication Data

US 2016/0007244 A1    Jan. 7, 2016

Related U.S. Application Data

(63) Continuation of application No. 14/527,291, filed on Oct. 29, 2014, now Pat. No. 9,173,137, which is a
(Continued)

(51) Int. Cl.
*H04W 36/00* (2009.01)
*H04W 36/04* (2009.01)
*H04W 84/04* (2009.01)

(52) U.S. Cl.
CPC ..... *H04W 36/0044* (2013.01); *H04W 36/0027* (2013.01); *H04W 36/04* (2013.01); *H04W 84/045* (2013.01)

(58) Field of Classification Search
None
See application file for complete search history.

(56) References Cited

U.S. PATENT DOCUMENTS 6,920,499 B2    7/2005    Chen
7,016,678 B1    3/2006    Kalliokulju et al.
(Continued)

OTHER PUBLICATIONS

OA dated May 10, 2012 for U.S. Appl. No. 12/276,717, 39 pages.
(Continued)

*Primary Examiner* — Steve Young
(74) *Attorney, Agent, or Firm* — Amin, Turocy & Watson, LLP

(57) ABSTRACT

Packet data protocol (PDP) contexts are managed upon cellular-to-femto handover, wherein femto network has disparate capabilities to support applications with distinct access point names (APNs) and quality of service (QoS) profiles. Based at least on activity factors of applications associated with PDP contexts, a QoS-based ranking of PDP contexts, and subscriber input, cellular network platform selects active PDP contexts to retain and suspend upon handover. A group of active PDP contexts is handed off in accordance with femto coverage capability, with remaining active PDP contexts suspended during handover. When a suspended PDP context, and application associated therewith, is resumed through femto coverage, a PDP context modification is conducted with a new APN and the application is routed to a corresponding femto gateway node and application server. Additionally, femto network platform performs a radio access bearer reconfiguration to meet QoS requirements of the resumed PDP context.

20 Claims, 7 Drawing Sheets

Related U.S. Application Data continuation of application No. 12/276,710, filed on Nov. 24, 2008, now Pat. No. 8,902,850.

(56) References Cited

U.S. PATENT DOCUMENTS

| | | | |
|---|---|---|---|
| 7,197,312 B2 | 3/2007 | Gunaratnam et al. | |
| 7,433,961 B2 | 10/2008 | Munje et al. | |
| 7,609,673 B2 | 10/2009 | Bergenlid et al. | |
| 7,920,522 B2 | 4/2011 | Ahmavaara | |
| 7,961,703 B2 * | 6/2011 | Suzuki | H04W 76/045 370/338 |
| 7,961,875 B2 | 6/2011 | Sachs et al. | |
| 8,472,422 B2 * | 6/2013 | Johansson | H04W 76/027 370/338 |
| 2003/0039237 A1 | 2/2003 | Forslow | |
| 2005/0030947 A1 | 2/2005 | Alfano et al. | |
| 2005/0221770 A1 | 10/2005 | Shipshock | |
| 2007/0097983 A1 | 5/2007 | Nylander et al. | |
| 2007/0104158 A1 | 5/2007 | Liang et al. | |
| 2007/0147247 A1 | 6/2007 | Kalonji et al. | |
| 2007/0291338 A1 | 12/2007 | Williams et al. | |
| 2008/0089303 A1 * | 4/2008 | Wirtanen | H04W 76/064 370/342 |
| 2008/0095049 A1 | 4/2008 | Bugenhagen et al. | |
| 2008/0130594 A1 | 6/2008 | Suzuki | |
| 2008/0132269 A1 | 6/2008 | Shen et al. | |
| 2008/0182614 A1 | 7/2008 | Cormier et al. | |
| 2008/0256260 A1 | 10/2008 | Magnusson et al. | |
| 2009/0002140 A1 | 1/2009 | Higa et al. | |
| 2009/0034496 A1 | 2/2009 | Ko et al. | |
| 2009/0037413 A1 | 2/2009 | Castell et al. | |
| 2010/0020744 A1 | 1/2010 | Muratore et al. | |
| 2011/0200006 A1 | 8/2011 | Kwon et al. | |

OTHER PUBLICATIONS

OA dated May 4, 2012 for U.S. Appl. No. 12/276,710, 29 pages.
Office Action dated Oct. 25, 2012 for U.S. Appl. No. 12/276,717, 52 pages.
Office Action dated Oct. 11, 2012 for U.S. Appl. No. 12/276,710, 40 pages.
Office Action dated Mar. 11, 2013 for U.S. Appl. No. 12/276,717, 57 pages.
Office Action dated Jun. 25, 2013 for U.S. Appl. No. 12/276,717, 45 pages.
Office Action dated Jan. 15, 2014 for U.S. Appl. No. 12/276,717, 86 pages.
Office Action dated Jan. 15, 2014 for U.S. Appl. No. 12/276,710, 54 pages.
Notice of Allowance dated Jul. 11, 2014 for U.S. Appl. No. 12/276,717.
Office Action dated Jun. 27, 2014 for U.S. Appl. No. 12/276,710, 65 pages.
Notice of Allowance dated Jul. 29, 2014 for U.S. Appl. No. 12/276,710.
Office Action dated Jan. 13, 2015 for U.S. Appl. No. 14/512,771, 64 pages.
Office Action dated Mar. 6, 2015 for U.S. Appl. No. 14/527,291, 98 pages.
Notice of Allowance dated Apr. 22, 2015 for U.S. Appl. No. 14/512,771, 117pgs.
Office Action dated Mar. 29, 2016 for U.S. Appl. No. 14/805,095, 142 pages.
Notice of Allowance dated Jul. 12, 2016 for U.S. Appl. No. 14/805,095, 126 pgs.

* cited by examiner

SELECTION OF PACKET DATA PROTOCOL CONTEXT FOR HANDOVER FROM CELLULAR NETWORK TO FEMTO CELL

CROSS-REFERENCE TO RELATED APPLICATIONS

The subject application is a continuation of, and claims priority to, U.S. patent application Ser. No. 14/527,291 (now U.S. Pat. No. 9,173,137, issued Oct. 27, 2015), entitled "SELECTION OF PACKET DATA PROTOCOL CONTEXT FOR HANDOVER FROM CELLULAR NETWORK TO FEMTO CELL," filed on Oct. 29, 2014, which is continuation of and claims priority to U.S. patent application Ser. No. 12/276,710 (now U.S. Pat. No. 8,902,850, issued Dec. 2, 2014), entitled "SELECTION OF PACKET DATA PROTOCOL CONTEXT FOR HANDOVER FROM CELLULAR NETWORK TO FEMTO CELL," filed on Nov. 24, 2008. The entireties of the above-mentioned applications are hereby incorporated herein by reference.

TECHNICAL FIELD

The subject application relates to wireless communications and, more particularly, to packet data protocol (PDP) context management to facilitate an adequate user experience when a mobile device is handed off from cellular network service to a femto cell coverage.

BACKGROUND

Femto cells—building-based wireless access points interfaced with a wired broadband network—are generally deployed to improve indoor wireless coverage, and to offload a mobility radio access network (RAN) operated by a wireless service provider. Improved indoor coverage includes stronger signal and improved reception (e.g., voice or data), ease of session or call initiation, and session or call retention as well. Offloading a RAN reduces operational and transport costs for the service provider since a lesser number of end users utilizes over-the-air radio resources (e.g., radio frequency channels), which are typically limited.

Coverage of a femto cell, or femto access point (AP), is generally intended to be confined within the bounds of an indoor compound (e.g., a residential or commercial building) in order to mitigate interference among mobile stations covered by a cellular cell and terminals covered by the femto AP. Additionally, confined coverage can reduce interference among terminals serviced by disparate, neighboring femto cells as well. Femto cells typically operate in licensed portions of the electromagnetic spectrum, and generally offer plug-and-play installation; e.g., automatic configuration of femto AP subsequent to femto cell subscriber registration with a service provider. Coverage improvements regarding voice and/or data services with substantive delay sensitivity via femto cells can also mitigate customer attrition as long as a favorable subscriber perceived service experience is attained. In addition, a richer variety of wireless voice and data services can be offered to customers via a femto cell since such service offerings do not rely primarily on mobility RAN resources.

Rich or superior subscriber experience when accessing service through femto cells depends at least in part on adequate handover performance when a mobile station moves from cellular, or macro, network coverage to femto cell coverage. In particular, service retention during handover and data deployment (e.g., routing) from the cellular network to the femto cell depends at least on attachment to a proper femto cell access point, and ensuing preservation of active service(s) like a voice call or data session initiated prior to handoff. It should be appreciated that handover performance can challenge subscriber experience in view of uncovered performance issues during initial deployment. Specific aspects to accomplish such retention of service(s) and thus ensure superior user experience can be dictated at least in part by relative capabilities (such as packet data protocol support) of entities that manage femto cell service with respect to capabilities of a cellular network platform, and efficient management of such capabilities.

DETAILED DESCRIPTION

Figure 1:
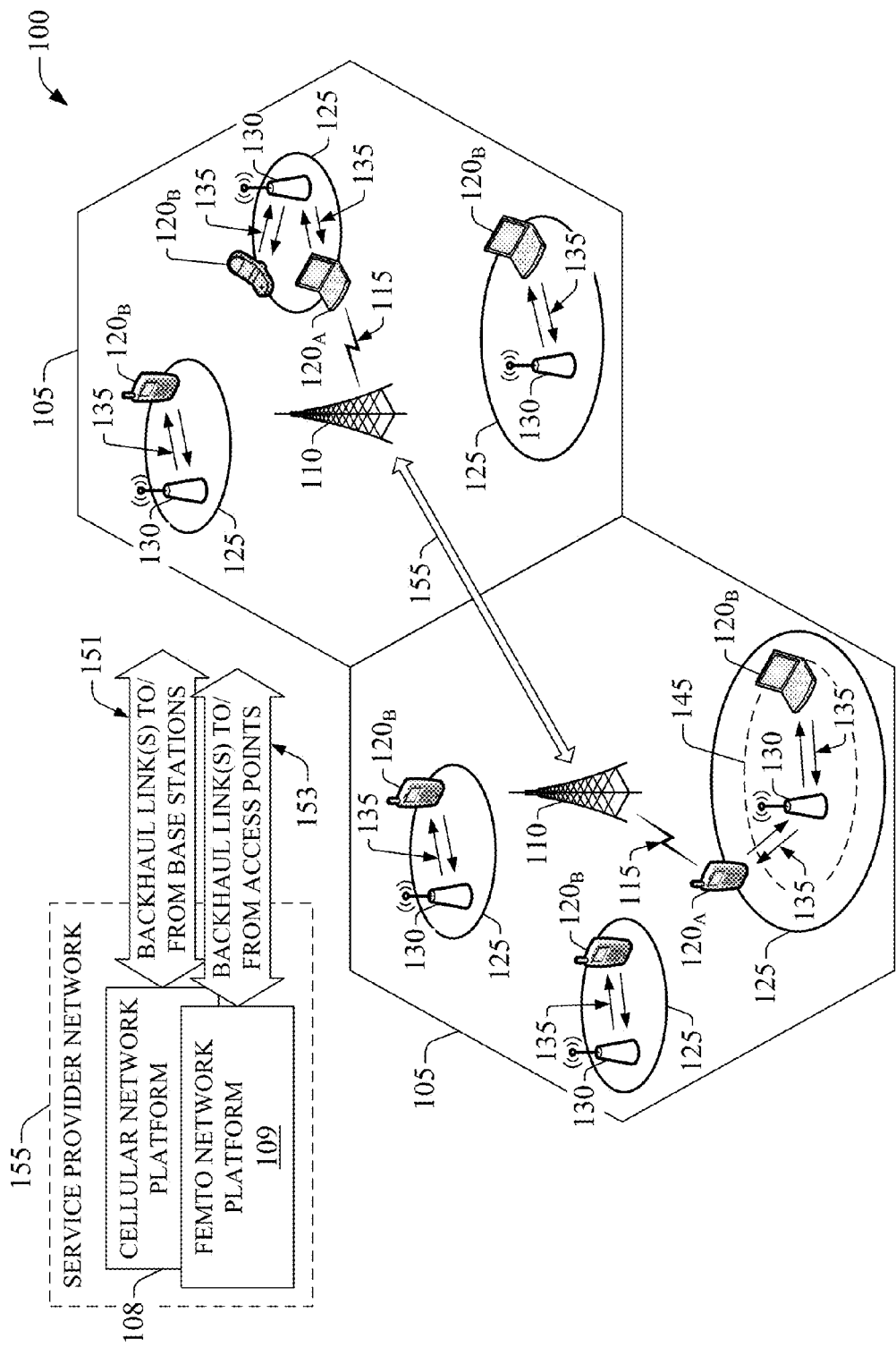
FIG. 1 illustrates a wireless environment that includes macro cells and femto cells for wireless coverage in accordance with aspects described herein.

The subject application is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," "platform," "service," "framework," "interface," "selector," and the like are intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, within the subject specification, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," subscriber station," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms) which can provide simulated vision, sound recognition and so forth. As utilized herein, the term "prosumer" indicate the following contractions: professional-consumer and producer-consumer.

In addition, the terms "wireless network" and "network" are employed interchangeably in the subject application, when context wherein the term is utilized warrants distinction for clarity purposes such distinction is made explicit. Likewise, the terms "femto cell access point" and "femto access point" are also utilized interchangeably.

The subject application provides system(s) and method(s) to manage packet data protocol (PDP) contexts upon cellular-to-femto handover, wherein femto network has disparate capabilities to support applications with distinct access point names (APNs) and quality of service (QoS) profiles. Based at least on activity factors of applications associated with PDP contexts, a QoS-based ranking of PDP contexts, and subscriber input, cellular network platform selects active PDP contexts to retain and suspend upon handover. A group of active PDP contexts is handed off in accordance with femto coverage capability, with remaining active PDP contexts suspended during handover. When a suspended PDP context, and application associated therewith, is resumed through femto coverage, a PDP context modification is conducted with a new APN and the application is routed to a corresponding femto gateway node and application server. Additionally, femto network platform performs a radio access bearer reconfiguration to meet QoS requirements of the resumed PDP context.

Aspects, features, or advantages of the subject application can be exploited in handover events among substantially any wireless communication technology; for example, Wi-Fi, Worldwide Interoperability for Microwave Access (Wi-MAX), Enhanced General Packet Radio Service (Enhanced GPRS), Third Generation Partnership Project (3GPP) Long Term Evolution (LTE), Third Generation Partnership Project 2 (3GPP2) Ultra Mobile Broadband (UMB), or High Speed Packet Access (HSPA).

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

Referring to the drawings, FIG. 1 illustrates an example wireless environment that includes macro cells and femto cells for wireless coverage in accordance with aspects described herein. In wireless environment 100, two areas 105 represent cellular or "macro" coverage, each macro cell is served by a base station 110. It should be appreciated that macro cells 105 are illustrated as hexagons; however, macro cells can adopt other geometries generally dictated by a deployment configuration or floor plan, geographic areas to be covered (e.g., a metropolitan statistical area (MSA) or rural statistical area (RSA)), and so on. Cellular coverage is generally intended to serve mobile wireless devices, like UE $120_A$, in outdoors locations. An over-the-air wireless link 115 provides such coverage, the wireless link 115 comprises a downlink (DL) and an uplink (UL), and utilizes a predetermined band of the radio frequency (RF) spectrum. As an example, UE $120_A$ can be a Third Generation Partnership Project (3GPP) Universal Mobile Telecommunication System (UMTS) mobile phone. It is noted that a base station, its associated electronics, circuitry or components, and a wireless link operated in accordance to the base station form a radio access network (RAN). In addition, base station 110 communicates via backhaul link(s) 151 with a cellular network platform 108, which in wireless technologies (e.g., 3GPP Universal Mobile Telecommunication System (UMTS), Global System for Mobile Communication (GSM)) typically represents a core network. In an aspect, cellular network platform 108 controls a set of base stations 110 that serve either respective cells or a number of sectors (not shown) within such cells. Cellular network platform 108 also communicates with other base stations (not shown) that serve other cells (not shown). Backhaul link(s) 151 can include a wired backbone link (e.g., optical fiber backbone; twisted-pair line; T1/E1 phone line; a digital subscriber line (DSL), either synchronous or asynchronous; an asymmetric DSL; a coaxial cable . . . ). Backhaul pipe(s) 155 links disparate base stations 110.

In wireless environment 100, within one or more macro coverage cell 105, a set of femto cells 125 served by respective femto access points (APs) 130 can be deployed.

While in illustrative wireless environment 100 three femto cells are deployed per macro cell 105, aspects of the subject application are geared to femto cell deployments with substantive femto AP density, e.g., $10^3$-$10^6$ femto APs 130 per base station 110. A femto cell 125 typically covers an area that includes confined area 145, which is determined, at least in part, by transmission power allocated to femto AP 130, path loss, shadowing, and so forth. While coverage area 125 and confined area 145 typically coincide, it should be appreciated that in certain deployment scenarios, coverage area 125 can include an outdoor portion (e.g., a parking lot, a patio deck, a recreation area such as a swimming pool and nearby space) while area 145 spans an enclosed living space. Coverage area typically is spanned by a coverage radius that ranges from 20 to 100 meters. Confined coverage area 145 is generally associated with an indoor space such as a building, either residential (e.g., a house, a condominium, an apartment complex) or business (e.g., a library, a hospital, a retail store), which encompasses a setting that can span about 5000 sq. ft.

A femto AP 130 typically serves a few (for example, 1-5) wireless devices (e.g., subscriber station $120_B$) within confined coverage area 125 via a wireless link 135 which encompasses a downlink and an uplink. A femto network platform 109 can control such service, in addition to mobility handover from cellular-to-femto and vice versa, and registration and provisioning of femto APs. Control, or management, is facilitated by backhaul link(s) 153 that connect deployed femto APs 130 with femto network platform 109. Backhaul pipe(s) 153 are substantially the same as backhaul link(s) 151. In an aspect of the subject application, part of the control is effected by femto AP 130 through measurements of radio link conditions and other performance metrics. It should be appreciated that such measurements can dictate, at least in part, handover events from cellular network coverage to femto network coverage; e.g., terminal $120_A$ moves from coverage provided through base station 110 to coverage delivered via femto AP 130. Femto network platform 109 also includes components, e.g., nodes, gateways, and interfaces, that facilitates packet-switched (PS) (e.g., internet protocol (IP), frame relay protocol, asynchronous transfer mode (ATM), . . . ) traffic and signaling generation for networked telecommunication. It should be appreciated that femto network platform 109, which controls and manages femto coverage, can integrate seamlessly with substantially any packet switched (PS)-based and circuit switched (CS)-based network such as cellular network platform 108. Thus, operation with a wireless device such as $120_A$ is substantially straightforward and seamless when handover from cellular-to-femto, or vice versa, takes place. As an example, femto network platform 270, and thus femto AP(s) 130, can integrate into an existing 3GPP Core Network via conventional interfaces like Iu-CS, Iu-PS, Gi, Gn. It is to be noted that substantially all voice or data active sessions associated with subscribers within femto cell coverage (e.g., area 125) are terminated once the femto AP 130 is shut down; in case of data sessions, data can be recovered at least in part through a buffer (e.g., a memory) associated with a femto gateway node(s) at the femto network platform 109. Coverage of a suspended or hotlined subscriber station or associated account can be blocked over the air-interface. However, if a suspended or hotlined customer who owns a femto AP 130 is in "hotline"/"suspend" status, there is no substantive impact to the customers covered through the subject femto AP 130. In another aspect, femto AP 130 can exploit high-speed downlink packet access either via an interface with macro network platform 108 or through femto network platform 109 in order to accomplish substantive bitrates.

In addition, in yet another aspect, femto AP 130 has a LAC (location area code) and RAC (routing area code) that is different from the underlying macro network. These LAC and RAC are used to identify subscriber station location for a variety of reasons, most notably to direct incoming voice and data traffic to appropriate paging transmitters, and emergency calls as well. As a subscriber station (e.g., UE $120_A$) that exploits cellular coverage (e.g., cell 105) enters femto coverage (e.g., area 125), the subscriber station (e.g., UE $120_A$) attempts to attach to the femto AP 130 through transmission and reception of attachment signaling as part of a handover procedure. The signaling is effected via DL/UL 135; the attachment signaling can include a Location Area Update (LAU) and/or Routing Area Update (RAU) procedure. Such attachment attempts are a part of procedures to ensure mobility, so voice calls and data sessions can continue even after a cellular-to-femto transition or vice versa. Conversely, if not successful, UE $120_A$ is generally commanded (through a variety of communication means) to select another LAC/RAC or enter "emergency calls only" mode. It is to be appreciated that this attempt and handling process can occupy significant UE battery, and femto AP capacity and signaling resources (e.g., communication of pilot sequences) as well. It is to be noted that UE $120_A$ can be employed seamlessly after either of the foregoing transitions. In addition, it should be appreciated that femto networks typically are designed to serve stationary or slow-moving traffic with reduced signaling loads compared to cellular networks.

When an attachment attempt within a cellular-to-femto handover is successful, UE $120_A$ is allowed on femto cell 125 and incoming voice and data traffic are paged and routed to the subscriber through the femto AP 130. As described below, in an aspect of the subject application, paging and routing updates at a time UE $120_A$ is handed off are managed at least in part through femto network platform 109. To facilitate voice and data routing, and control signaling as well, successful attachment can be recorded in a memory register, e.g., a Visitor Location Register (VLR), or substantially any data structure stored in a network memory. It is to be noted also that packet communication (e.g., voice and data traffic, and signaling as well) is typically paged/routed through a backhaul link(s) 153. To this end, femto AP 130 is typically connected to backhaul link(s) 152 via a broadband modem (not shown) that resides within the femto AP. Through backhaul pipe(s) 153, a femto AP 130 can handle substantially any quality of service (QoS) for heterogeneous packetized traffic (e.g., multiple packet flows). In an aspect of the subject application, femto AP 130 can display status indicators for power, active broadband/DSL connection, and gateway connection. In another aspect, no landline is necessary for operation of femto AP(s) 130.

Figure 2:
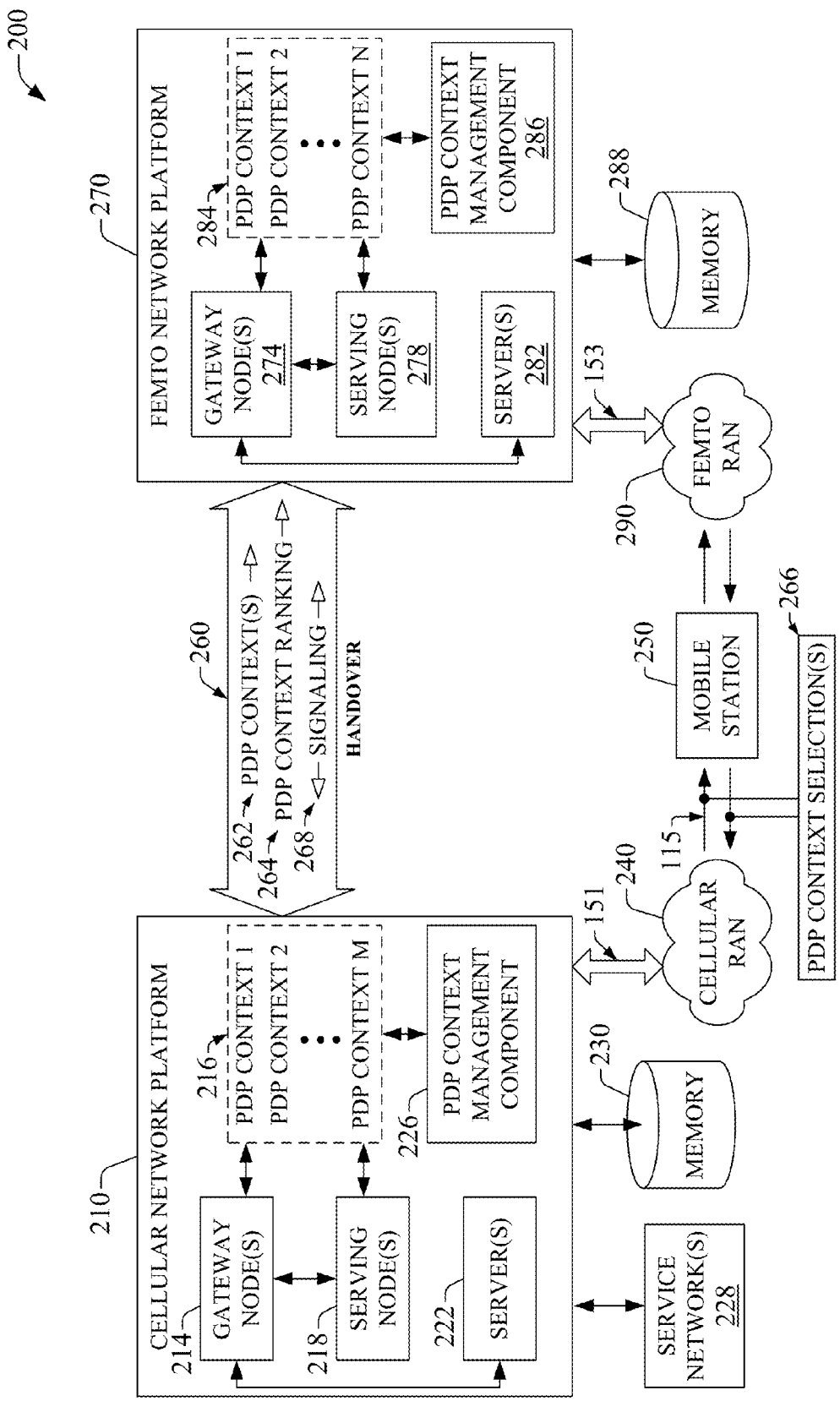
FIG. 2 is a block diagram of an example system that facilitates PDP context management upon cellular-to-femto handover in accordance with aspects of the subject application.

FIG. 2 illustrates a block diagram of an example system 200 that facilitates packet data protocol (PDP) context management upon cellular-to-femto handover. Cellular network platform 210 serves a mobile station 250 via a cellular RAN 240, which includes a set of base stations (e.g., (Node B 110) deployed in a market area (e.g., a set macro cells 105) and a communication platform (e.g., antennas, transceivers and associated electronic circuitry, processor(s), a memory(ies) . . . ) in addition to wireless links to provide cellular coverage in accordance with operation of the base station(s). Cellular RAN 240 effects wireless communication via one or more radiofrequency (RF) resources, which typically include licensed RF bands such as those within personal communication services (PCS), advanced wireless services (AWS), general wireless communications service (GWCS), and so forth. Upon cellular-to-femto handover, mobile station 250 is covered through femto cell service platform 270 via femto RAN 290. As mentioned above, it is to be appreciated that deployment density in femto RAN 290 is substantially higher than in macro RAN 240.

In cellular network platform 210, server(s) 222 can provide data services which generate multiple disparate packetized data streams or flows associated with applications available to cellular network platform 210. Server(s) 222 can manage (e.g., schedule, queue, format . . . ) such flows. Among the various data services, or applications, server(s) 222 can provide the following: IP television, video- and sound-streaming, voice and data, mobile's firmware update(s), data upload/download for on-the-cloud storage or web hosting, location services, online gaming, wireless banking, wireless device management, etc. Moreover, server(s) 222 can provision at least in part services from external service network(s) 228, e.g., (e.g., emergency location services, IP multimedia subsystem (IMS), telephony network(s), WAN(s)/LAN(s), enterprise network(s), or signaling system #7 (SS7) network(s), or Global Positioning System (GPS) network(s). Furthermore, server(s) 222 can effect security (e.g., implement one or more firewalls) of cellular network platform 210 to ensure network's operation and data integrity. Server(s) 282 in femto network platform possess substantially the same functionality as server(s) 222.

Data streams generated through data services can be conveyed to gateway node(s) 214, which can comprise circuit switched (CS) gateway node(s) and packet switched (PS) gateway node(s), for authorization/authentication and initiation of a data session to consume such data streams. In an aspect, authentication can be implemented through an authentication component (not shown) which can implement remote authentication dial-in user service (RADIUS). As part of authentication of a data session, gateway node(s) 214 can generate packet data protocol (PDP) context(s) when a data session is authorized and established. Upon generation of a PDP context, a private logical network address (e.g., an IP address) and port for a served mobile station 250 is created and conveyed to serving node(s) for routing purposes. An active PDP context (e.g., PDP context 2) is retained within gateway node(s) 214 and serving node(s) 218; even though active PDP contexts are pictorially presented as external to gateway node(s) 214 and serving node(s) 218. As indicated above, gateway node(s) 214 receives data packets from applications (e.g., a web browser) provided through server(s) 222 and service network(s) 228; such data is received in accordance with APNs in active PDP contexts, wherein disparate APNs reference disparate gateway node(s). Data packets received at gateway node(s) 214 are relayed to serving node(s) 218 in accordance to scheduled QoS for respective active PDP contexts. Serving node(s) 218 routes packetized flows of such data packets, or data streams, in accordance with the information retained in active PDP contexts, and the. As an example, in a 3GPP UMTS network, gateway node(s) 214 can be embodied in gateway GPRS support node(s) (GGSN), while serving node(s) 218 can be embodied in serving GPRS support node(s) (SGSN).

In an aspect, each of M active PDP contexts 216 have distinct access point names (APNs); such PDP contexts can be activated either trough mobile station 250 or cellular network platform 210. Network capabilities generally dictate a maximum number $M_{MAX}$ (a positive integer; e.g., $M_{MAX}$=3) of allowed active contexts associated with mobile station 250. In addition to an APN, an active PDP context includes a quality of service (QoS) profile, e.g., a QoS scheduled by cellular network platform 210 in accordance with subscriber type. Subscribers with an agreed quality of QoS (e.g., maximum DL or UL bit error rate(s), average packet error rate(s), or block error rate(s); guaranteed DL or UL bit rate . . . ) are scheduled at such level, whereas best effort QoS can be provided to subscribers with soft QoS requirements. Moreover, an active PDP context(s) has an associated radio access bearer (RAB) configured through cellular network platform 210 in accordance with the QoS profile of the PDP context.

In an aspect of the subject application, when it is determined to handover mobile station 250 from cellular coverage to femto cell coverage, which is provided through femto cell network platform 270 and femto RAN 290, a PDP context management component 226 facilitates retention of active data service(s) that provides data packets (e.g., for a voice call or data session). It should be appreciated that features of PDP context management component 226 discussed hereinafter are substantially independent whether mobile station 250 or a base station within cellular RAN 240 initiates cellular-to-femto handover signaling.

PDP context management component 226 acquires network capability information of the femto cell; e.g., the maximum number N (a positive integer) of PDP contexts with different APN that are supported by a femto cell (e.g., femto AP 130) managed through femto network platform 270. It should be appreciated that $N \leq M_{MAX}$. As an example, N=1, which can be a scenario in an early deployment of femto cell(s) for confined indoor coverage, with the femto coverage managed or controlled in part through femto network platform 270.

In addition, PDP context management component 226 compares the activity factor of the M active PDP contexts 216 and application associated therewith. Activity factor can be a logical binary variable that assesses the activity of an application or data service assigned an active APN; a logic NULL value for an inactive application, or data service, and a logic non-NULL value otherwise. At a time of cellular-to-femto handover, active PDP context(s) with non-NULL activity factor can be considered for handover evaluation and preparation, whereas PDP context(s) with NULL activity factors can be suspended. As an example, an email application in mobile station 250 may not be receiving an email message from an email server at a time of handover, and thus the application has a NULL activity factor and is not contemplated for handover, even though it is associated with an active PDP context. As another example, a web-based commercial transaction may be in process at a time of cellular-to-femto handover; thus, an active PDP associated with a web browser application that facilitates the transaction has non-NULL activity factor.

For the set of M' PDP contexts that have non-NULL activity factor, PDP context management component compares respective QoS profiles and generates a PDP context ranking 264, which can be conveyed to femto network platform 270. It should be appreciated that such set can include all M PDP contexts 216. Based on the maximum number N of PDP contexts with disparate APN supported by femto network platform, PDP context(s) 262 with the highest QoS rank(s) can be handed-over to the femto cell, while the other M-N contexts, and associated applications, are suspended. The N handed-over PDP contexts 284 are anchored in femto gateway node(s) 274 and serving node(s) 278; an application or data service associated with the handed-over PDP context remains to execute within server(s) 222 or service network(s) 228. PDP context management component maintains suspended PDP contexts until a first handed off PDP context is completed and released. In a scenario where N=1, a single application is maintained through cellular-to-femto handover.

In an aspect of the subject application, a indication of the foregoing selection of active PDP contexts to be retained, and suspended, through handover of mobile station 250 to femto coverage, can be conveyed to mobile station 250 as part of preparation for handoff. The selection indication can be embodied in an email, an instant message (IM), a short message service (SMS) communication, a ringtone or another predetermined sound, and the like. In addition to the latter high-level formats, the selection indication can be a low-level signal (e.g., an P-bit word, with P a positive integer) transported in a control channel. The indication in mobile station 250 can prompt an end user for confirmation or rejection of the cellular network platform 210 selection of active PDP contexts to retain or to suspend upon handover. A rejection indication, can further prompt the end user to select a disparate set of active PDP contexts to maintain during handover, and a set to suspend during handover; PDP context selection 266 can be conveyed to cellular network platform. At least one advantage of subscriber selection of PDP contexts to retain is that final decision making can lay with the subscriber, and thus user experience is richer and more satisfactory for the subscriber.

When a handed-over PDP context is terminated, or released, femto cell network can initiate the resume of a suspended PDP context, with a non-NULL activity factor at a time of preparation for handover, based at least in part on the PDP context QoS-ranking or a PDP context selection 266 received from mobile station 250. In an aspect, a femto cell to which mobile station 250 has been handed off can trigger a PDP context modification of a highest QoS-ranking suspended PDP context; PDP management component 286 can trigger such request. Such request can be conveyed (e.g., signaling 268) through femto network platform 270 to serving node(s) 218 (e.g., SGSN in a 3GPP UMTS network) to change routing of the suspended PDP context to a gateway node in femto gateway node(s) 274 per the new APN. In an aspect, the gateway node in femto gateway node(s) 274 conveys the new APN to serving node(s) 278. It should be appreciated that the new APN facilitates connection to application server(s) 282, which generates data packets for the handed over mobile station 250. Moreover, femto gateway node(s) 274 can receive data packets from server(s) 222 and service network(s) 228 through reference point, or link, 260, via the new APN. (It should be noted that the gateway node that anchors the new APN in femto gateway node(s) 274 can be embodied, e.g., in a GGSN when femto network platform interfaces with a 3GPP UMTS cellular network.) PDP management component 286 can exploit a PDP context ranking 264, received through reference point, or link, 260, in order to determine a PDP context to resume once a handed-over PDP context is released. Upon completion of context modification of the suspended PDP context, the femto cell in femto RAN 290 to which the mobile station 250 was handed over can resume the suspended PDP context through femto network platform 270. Additionally, femto network platform 270 can reconfigure, via PDP context management component 286, a radio access bearer (RAB) associated with the released PDP context in accordance with the QoS requirements of the resumed PDP context in order to ensure that bandwidth, delay, and other QoS priorities are met. The reconfigured RAB is associated with the resumed PDP context.

Once a RAB is configured for a resumed PDP context, data services provided through server(s) 282 can deliver data packets to gateway node(s) 274 to serve mobile station 250 after cellular-to-femto handover is complete. Data packet(s) are generated through execution of application(s) that provides service (e.g., voice and data) to wireless devices served through femto RAN 290. Server(s) 1082 can also provide security features to femto network platform. In addition, server(s) 282 can manage (e.g., schedule, queue, format . . . ) substantially all packetized flows (e.g., IP-based, frame relay-based, ATM-based) it generates in addition to data received from macro network platform 1010. Furthermore, server(s) 282 can effect provisioning of femto cell service, and effect operations and maintenance.

It is to be noted that in addition to the functionality described herein, femto gateway node(s) 274 have substantially the same functionality as gateway node(s) 214. Likewise, femto serving node(s) 278 can include substantially all functionality of serving node(s) 218. Femto serving node(s) 278 can control or operate disparate sets of deployed femto APs, which can be a part of femto RAN 1090, and convey traffic and signaling via the deployed femto APs in accordance with active PDP contexts 284, which can be configured as described in the subject application during cellular-to-femto handover.

At least one advantage of the subject application is that, rather than to drop active RABs and various PDP contexts each with different APNs for different gateway node(s) 214 (e.g., GGSNs in a 3GPP UMTS network) routing, it maintains substantially the same level of service for selected application(s) as a mobile station is handed over from cellular network coverage to femto cell coverage. Such an advantage provides a smoother user experience upon cellular-to-femto handover. It should be appreciated that the latter is accomplished even though capability in the femto network platform to serve applications with different APNs and QoS profiles can be lower than in the cellular network platform.

It is to be noted that a processor (not shown, but which can resided within server(s) 222 and server(s) 282) and other electronic circuitry (not shown) can effect the functionality of substantially all components, nodes and interfaces in serving network platform 210 and cellular RAN 240, and femto network platform 270 and femto RAN 290 as well. To effect such functionality, the processor can execute code instructions retained in a memory (e.g., memory 230 and memory 288).

Additionally, in example system 200, memory 230 can store information on subscriber(s) selection(s) of PDP context rankings of PDP contexts to suspend or to retain during cellular-to-femto handover. Moreover, memory 230 can retain information related to operation of cellular network platform 210. Information can include, but is not limited to, business data associated with subscribers; market plans and strategies, e.g., promotional campaigns, business partnerships; operational data for mobile devices served through macro network platform; service and privacy policies; end-user service logs for law enforcement; and so forth. Furthermore, memory 230 can store information from service network(s) 228.

Figure 3:
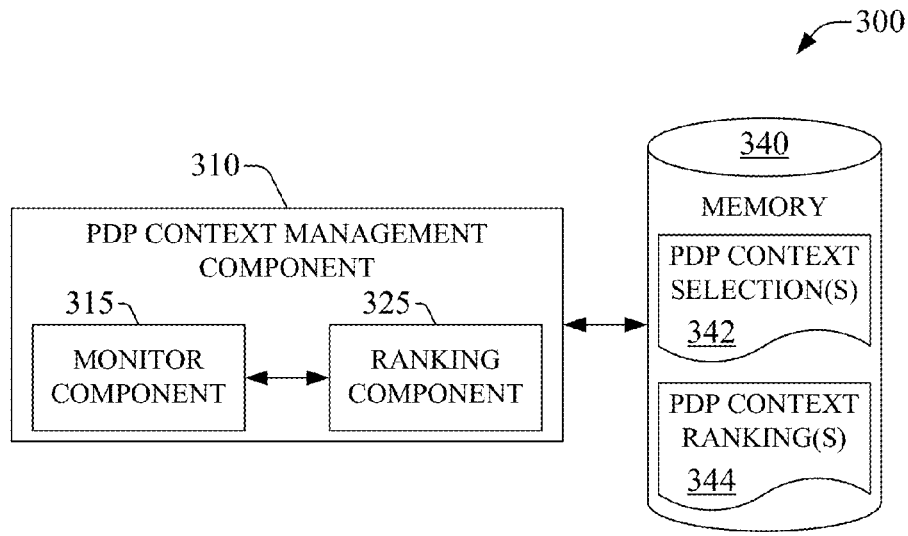
FIG. 3 is a block diagram of an example embodiment of a PDP context management component in accordance with aspects described herein.

FIG. 3 is a block diagram of an example embodiment 300 of a PDP context management component in accordance with aspects described herein. PDP context management component 310 can be employed in cellular network platform 210 or femto network platform 270. It should be appreciated that different functionalities of the components that comprise PDP context management component 310 can be exploited based on network platform. A monitor component 325 can survey various signaling (e.g., signaling 268) associated with handover; PDP context activity, or activity of an application associated with a PDP context; PDP context release; PDP context modification; femto network platform capability; PDP context selection (e.g., PDP context selection 266) received from a user equipment (e.g., mobile station 250) in preparation for handover. Information collected by monitor component 315 can be exploited to select PDP contexts to retain or suspend during cellular-to-femto handover. In an aspect, monitor component 325 can determine the activity factor of respective data service or application associated with a set of active PDP contexts. As discussed above, such information can be employed to determine a PDP context selection, which can be retained in a memory element 342 in memory 340.

In another aspect, when PDP context management component 310 operates within cellular network platform 210, monitor component 315 can covey information on active PDP contexts to ranking component 325, which can rank the active PDP contexts according to respective QoS profiles. Ranking component can retain PDP context ranking(s) in a memory element 344 in memory 340. In addition, monitor component 325 can receive an indication of a confirmation or rejection of a network-based PDP context selection, or a subscriber selection of PDP contexts to retain or suspend during handover.

Ranking component 325 can aggregate subscriber-injected PDP context selection and utilize it to infer future PDP context selections and rankings; historic PDP context selection can be stored in memory element 342 in memory 340. Ranking component 325 can exploit artificial intelligence (AI) methods to infer (e.g., reason and draw a conclusion based upon a set of metrics, arguments, or known outcomes in controlled scenarios) suitable PDP context selections for cellular-to-femto handover for a specific subscriber. Artificial intelligence techniques typically apply advanced mathematical algorithms—e.g., decision trees, neural networks, regression analysis, principal component analysis (PCA) for feature and pattern extraction, cluster analysis, genetic algorithm, or reinforced learning—to a data set; e.g., the collected subscriber intelligence in the case of subscriber segmentation. In particular, ranking component 325 can employ one of numerous methodologies for learning from data and then drawing inferences from the models so constructed. For example, Hidden Markov Models (HMMs) and related prototypical dependency models can be employed. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed. Moreover, game theoretic models (e.g., game trees, game matrices, pure and mixed strategies, utility algorithms, Nash equilibria, evolutionary game theory, etc.) and other approaches that perform data fusion, etc., can be exploited.

Alternatively, or in addition, when PDP context management component 310 operates in femto network platform 270, monitor component 325 can retain a received PDP context ranking (e.g., PDP context ranking 264) within a memory element 344 in memory 340. Retention of a ranking of PDP contexts suspended prior to cellular-to-femto handover facilitates to resume PDP after a handed-over PDP context is released.

Figure 4:
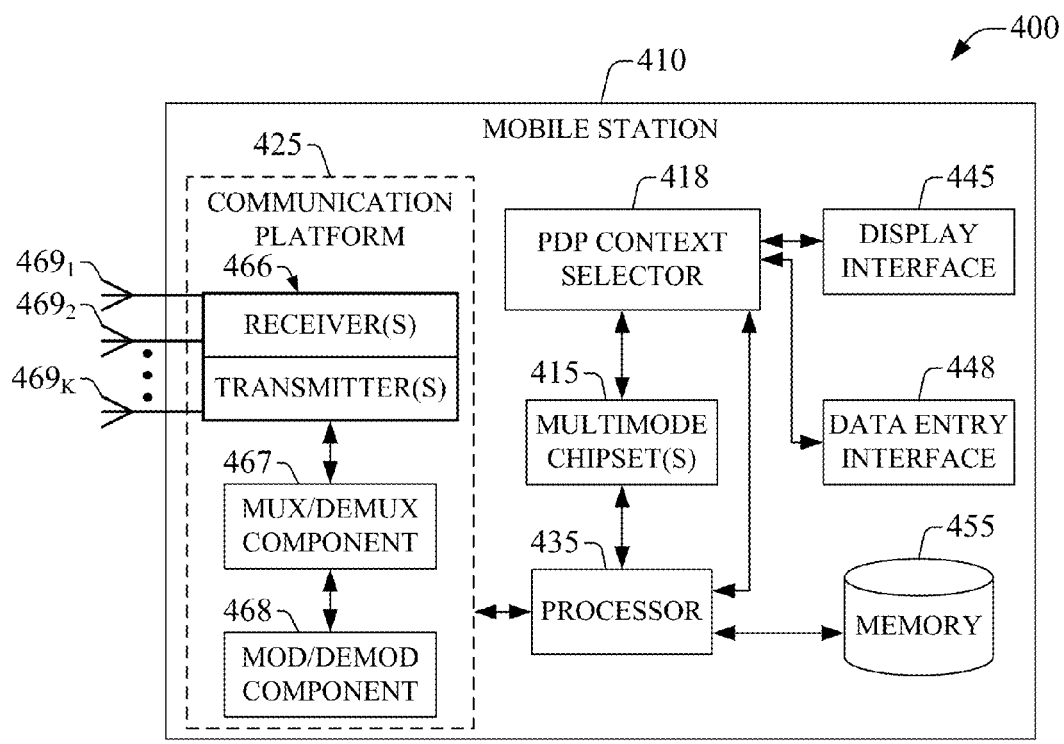
FIG. 4 is a block diagram of an embodiment of a mobile station that can select PDP contexts to retain and suspend through cellular-to-femto handover in accordance with aspects of the subject application.

FIG. 4 is a block diagram of an embodiment 400 of a mobile station that can select PDP contexts to retain and suspend through cellular-to-femto handover in accordance with aspects of the subject application. In mobile 410, which can be a multimode access terminal, a set of antennas $469_1$-$469_K$ (K is a positive integer) can receive and transmit signal(s) from and to wireless devices like access points, access terminals, wireless ports and routers, and so forth, that operate in a radio access network, e.g., cellular RAN 240 or femto RAN 290. It should be appreciated that antennas $469_1$-$469_K$ are a part of communication platform 425, which comprises electronic components and associated circuitry that provide for processing and manipulation of received signal(s) and signal(s) to be transmitted. In an aspect, communication platform 425 includes receiver(s)/transmitter(s) 466 that can convert signal from analog to digital upon reception, and from digital to analog upon transmission. In addition, receiver/transmitter 466 can divide a single data stream into multiple, parallel data streams, or perform the reciprocal operation; such operations typically conducted in various multiplexing schemes. Functionally coupled to receiver(s)/transmitter(s) 466 is a multiplexer/demultiplexer (mux/demux) component 467 that facilitates manipulation of signal in time and frequency space. Electronic mux/demux component 467 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 467 can scramble and spread information (e.g., codes) according to substantially any code; e.g., Hadamard-Walsh codes, Baker codes, Kasami codes, polyphase codes, and so on. A modulator/demodulator (mod/demod) component 468 is also a part of communication platform 425, and can modulate information according to various modulation techniques, such as frequency modulation (e.g., frequency-shift keying), amplitude modulation (e.g., Q-ary quadrature amplitude modulation (QAM), with Q a positive integer; amplitude-shift keying (ASK)), phase-shift keying (PSK), and the like. In an aspect of embodiment 400, mod/demod component 468 is functionally coupled to mux/demux component 467.

In embodiment 400, multimode operation chipset(s) 415 allows mobile 410 to operate in multiple communication modes, which can exploit various disparate electromagnetic (EM) radiation frequency bands, in accordance with disparate technical specification for wireless technologies. For example, mobile station can operate in a portion of RF frequency spectrum in multiple-input multiple-output (MIMO) mode when served through a cellular RAN, while it can operate in a disparate RF frequency band in single-input multiple-output mode (SIMO) when served via a femto RAN. In an aspect, multimode operation chipset(s) 415 utilizes communication platform 425 in accordance with a specific mode of operation and portion of EM radiation frequency spectrum. In another aspect, multimode operation chipset(s) 415 can be scheduled to operate concurrently (e.g., when K>1) in various modes or within a multitask paradigm.

Mobile 410 can include PDP context selector component 418, which can receive signaling associated with an indication of a selection of active PDP contexts to be retained and suspended at a time of handover from cellular coverage to femto coverage, and convey that signaling to an end user of mobile station 410 via display interface 445. In addition, PDP context selector 418 can convey a confirmation or rejection indication of a network-based selection of PDP contexts to maintain active and suspend during handover. Such indication can be an L-bit (L is a positive integer) word conveyed in a control channel, in one or more management in-band frames, or in a data packet. Moreover, PDP context selector 418 can deliver signaling associated with a subscriber selection of PDP contexts, wherein the selection includes a ranking or ordering of active PDP contexts selected to be suspended upon cellular-to-femto handover. The ranking or ordering facilitates a resume sequence of active PDP contexts once a handover PDP context is released. In an aspect, display interface 445 delivers a network-based selection of active PDP contexts to be suspended and retained upon handover from cellular to femto coverage, and prompts an end user to confirm or reject such selection. Delivery of the network-based PDP context selection, and a prompt to confirm or reject it can be accomplished through pop-up window(s), a token in an email or instant messenger, a ringtone accompanied with visual indicia, and so forth. End user input regarding rejection or confirmation of the network-based selection of PDP context behavior during handover can be entered via data entry interface 448. Data entry interface 448 facilitates inputting information like a rejection or a confirmation of a network-based selection of PDP contexts via various mechanisms such as key strokes, screen touch, biometric-based input or gesture (e.g., voice command), and so on. In case an end user rejects a cellular network-based selection, the end user is prompted to enter, via data entry interface 448, a PDP context selection and associated behavior, e.g., PDP context for suspension or retention.

Mobile 410 also includes a processor 435 configured to confer functionality, at least in part, to substantially any component within mobile 410, in accordance with aspects of the subject application. As an example, processor 435 can be configured to execute, at least in part, instructions in multimode operation chipset(s) that afford multimode communication through mobile 410 like concurrent or multitask operation of two or more chipset(s). Additionally, processor 435 facilitates mobile 410 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc. Memory 455 can store data structures (e.g., metadata); code structure(s) (e.g., modules, objects, classes, procedures) or instructions; network or device information like policies and specifications, attachment protocols; code sequences for scrambling, spreading and pilot (e.g., reference signal(s)) transmission; frequency offsets, cell IDs, and so on.

In embodiment 400, processor 435 is functionally coupled (e.g., through a memory bus) to memory 455 in order to store and retrieve information necessary to operate and/or confer functionality, at least in part, to communication platform 425, multimode operation chipset(s) 415, and other operational aspects of multimode mobile 410.

In view of the example systems described above, example methodologies that can be implemented in accordance with the disclosed subject matter can be better appreciated with reference to flowcharts in FIGS. 5-8. For purposes of simplicity of explanation, example methodologies disclosed herein are presented and described as a series of acts; however, it is to be understood and appreciated that the claimed subject matter is not limited by the order of acts, as some acts may occur in different orders and/or concurrently with other acts from that shown and described herein. For example, a methodology disclosed herein could alternatively be represented as a series of interrelated states or events, such as in a state diagram. Moreover, interaction diagram(s) may represent methodologies in accordance with the disclosed subject matter when disparate entities enact disparate portions of the methodologies. Furthermore, not all illustrated acts may be required to implement a methodology in accordance with the subject specification. Further yet, two or more of the disclosed methodologies can be implemented in combination with each other, to accomplish one or more features or advantages herein described. It should be further appreciated that the methodologies disclosed throughout the subject specification are capable of being stored on an article of manufacture to facilitate transporting and transferring such methodologies to computers for execution by one or more processors or for storage in a memory.

Figure 5:
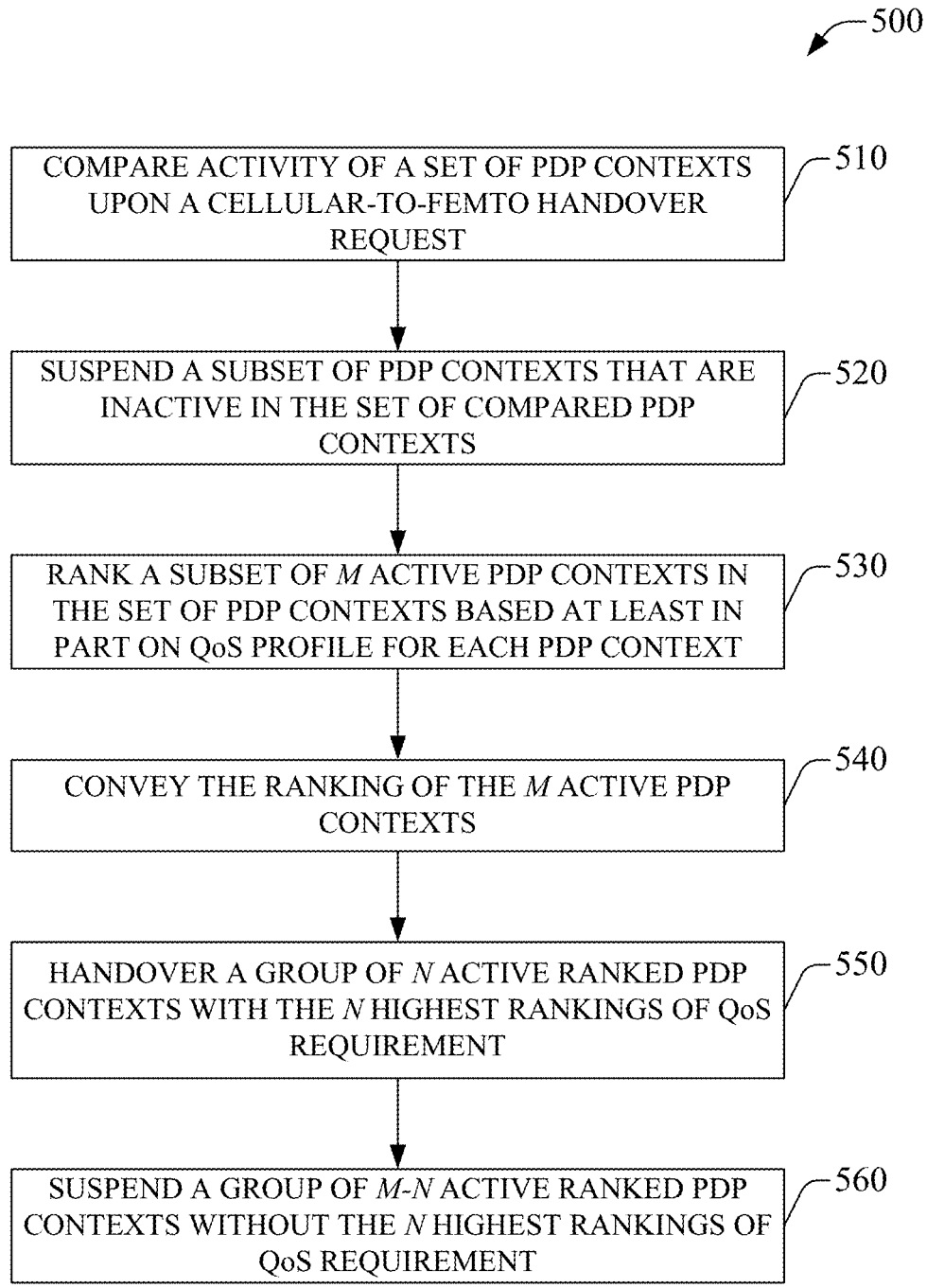
FIG. 5 presents a flowchart of an example method for managing PDP contexts during a cellular-to-femto handover of a mobile station according to aspects disclosed herein.

FIG. 5 presents a flowchart of an example method 500 for managing PDP contexts during a cellular-to-femto handover of a mobile station according to aspects disclosed herein. In an aspect, example method 500 can be effected by a cellular network platform (see FIG. 2). At act 510, activity of a set of PDP contexts is compared upon a cellular-to-femto handover request. In an aspect, such request can be signaled from a mobile station to a cellular network platform (e.g., cellular network platform 108) after a determination to attach to a femto cell is made (e.g., radio link quality is below a predetermined value as a result of entering an indoors femto cell coverage area, femto cell pilot signal is received . . . ). The number of PDP contexts that are compared can be determined by the number of PDP contexts with disparate APNs that a cellular network platform can support for a served mobile station. At act 520, a subset of PDP contexts that are inactive in the set of compared PDP contexts are suspended. At act 530, a subset of M (an integer greater or equal than zero) active PDP contexts in the set of compared PDP contexts are ranked based at least in part on QoS profile (e.g., required quality of service such as packet loss rate, block error rate, packet error rate, bit error rate for one or more applications) for each PDP context. At act 540, the ranking of the M active PDP contexts is conveyed. In an aspect, the ranking is conveyed to a femto network platform (see FIG. 2). At act 550, a group of N (with N a positive integer) active ranked PDP contexts with the N highest ranking of QoS requirements is handed over. The value of N can be acquired in conjunction with other network capability information from a femto cell network platform through adequate signaling as part of handover. At act 560, a group of M−N active ranked PDP contexts without the N highest rankings of QoS requirements are suspended.

Figure 6:
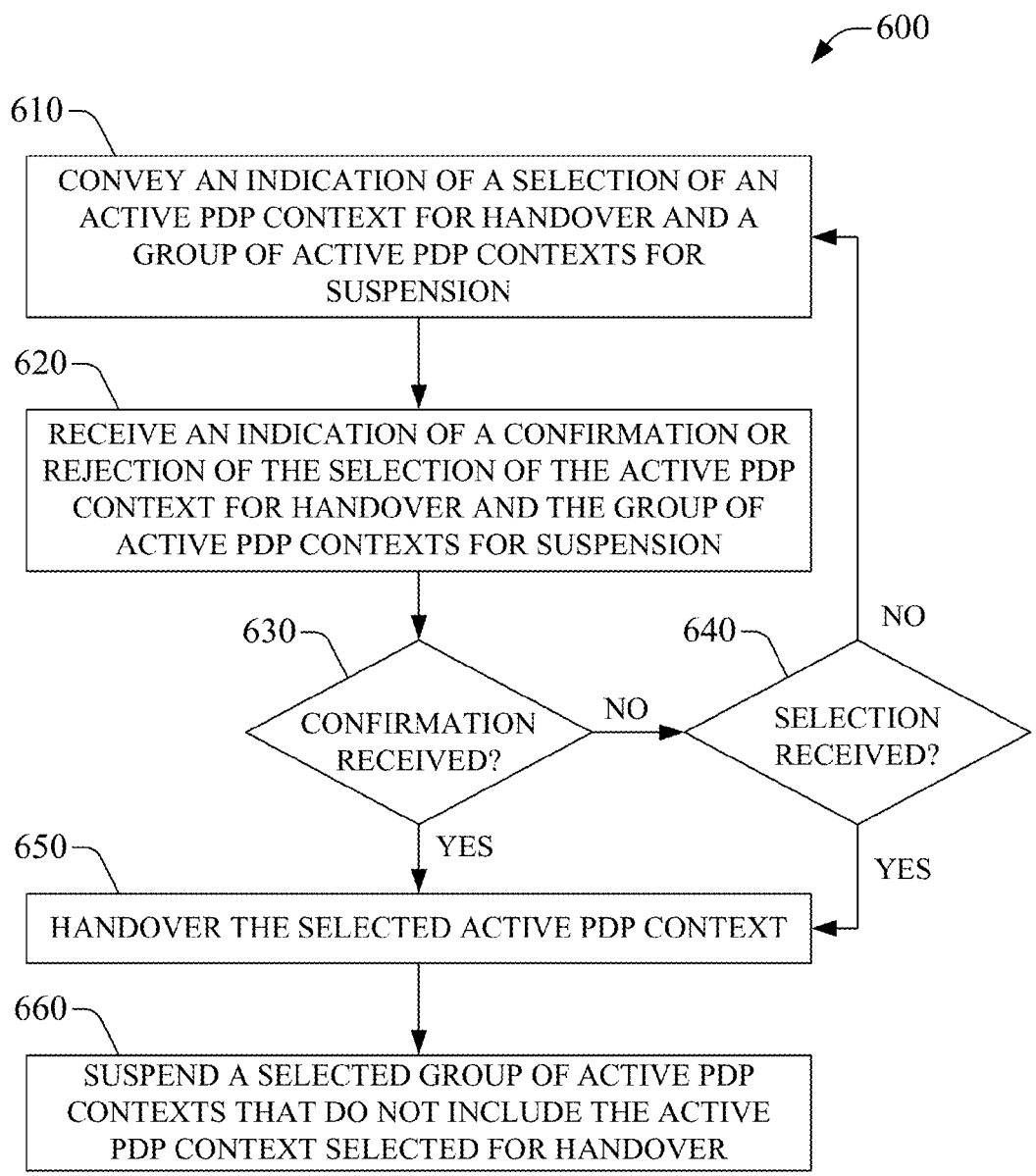
FIG. 6 presents a flowchart of an example method for selecting PDP contexts to hand off during a cellular-to-femto handover according to aspects of the subject application.

FIG. 6 presents a flowchart of an example method 600 for selecting PDP contexts to hand off during a cellular-to-femto handover according to aspects of the subject application. It should be appreciated that example method 600 can be employed in conjunction with example method 500 in order to inject subscriber decision-making regarding PDP contexts to be retained through a handover process. At act 610, an indication of a selection of an active PDP context for handover and a group of active PDP contexts for suspension is conveyed. In an aspect, the selection is conveyed to a mobile station that enters a femto cell coverage area from a macro cell. It should be appreciated that the selection of active PDP contexts for handover can be implemented through a ranking of QoS requirements of various PDP contexts and associated application(s), or via an inference based upon historic data on subscriber-driven selections. At act 620, an indication is received for either confirmation or rejection of the selection of the active PDP context for handover and the group of active PDP contexts for suspension. At act 630, it is checked whether a confirmation indication has been received. In the affirmative outcome, the selected active PDP context is handed off at act 650. Conversely, at act 640 it is evaluated whether a PDP context selection is received. In the affirmative case, flow is directed to act 650 and the selected PDP contexts are handed off. In the negative, flow is directed to act 610. At act 660, a selected group of active PDP contexts that do not include the active PDP context selected for handover is suspended. It should be appreciated that the selected PDP contexts that are suspended can arise from a cellular network platform-based selection and conveyed to an end user of a mobile station that hands over from cellular to femto, or it can arise from a PDP context selection received by the cellular network platform.

Figure 7:
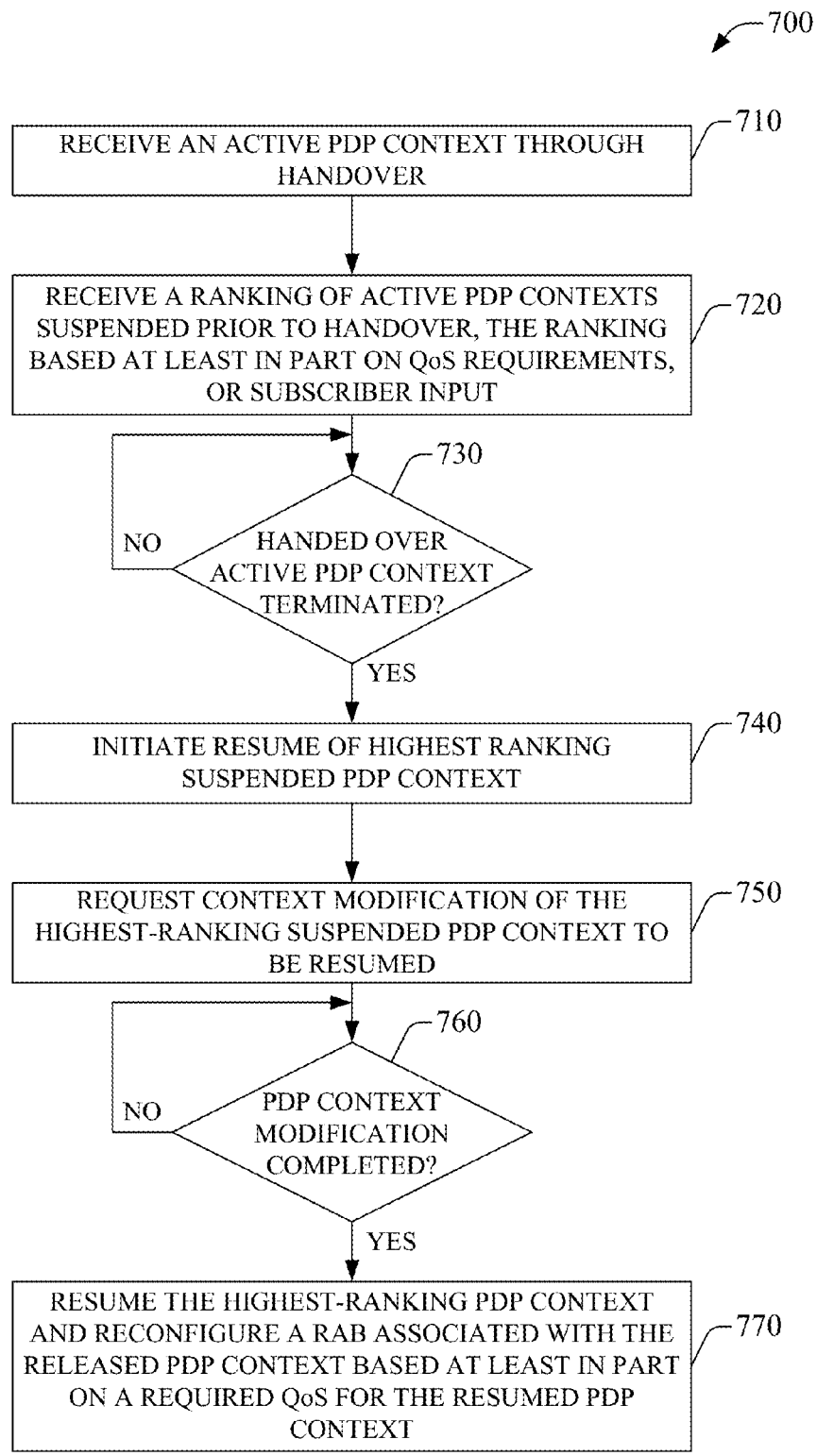
FIG. 7 is a flowchart of an example method for utilization of active PDP contexts during a cellular-to-femto handover according to aspects described in the subject specification.

FIG. 7 is a flowchart of an example method 700 for utilization of active PDP contexts during a cellular-to-femto handover according with aspects of the subject application. In an aspect, example method 700 can be enacted by a femto network platform that serves a femto cell to which a mobile station is to be handed off from the cellular coverage to femto coverage. At act 710, an active PDP context is received. At act 720, a ranking of active PDP contexts suspended in preparation for handover is received, the ranking can be based at least in part on QoS requirements. Additionally, the ranking can be based on subscriber input. (i) A ranking of active PDP contexts suspended in preparation for handover can arise from a direct subscriber selection. (ii) A ranking can be autonomously inferred based at least in part on historic data on previous subscriber selections of active PDP contexts suspended prior to handover effected by a served subscriber that is to be handover from cellular coverage to femto coverage. At act 730 it is checked whether an active PDP context is terminated, or released. In the affirmative case, resume of highest-ranking suspended active PDP context is initiated at act 740. Conversely, evaluation act 730 is re-enacted. At act 750, PDP context modification of the highest-ranking suspended PDP context to be resumed is requested. Such a request can be triggered by a femto network platform (see, e.g., FIG. 2). At act 760 it is checked whether PDP context modification, of the highest-ranking suspended PDP context is completed. In the affirmative case, at act 770, the highest-ranking PDP context is resumed and a radio access bearer (RAB) associated with the terminated, or released, PDP context is configured based at least in part on a required QoS for the resumed PDP context. When at act 760 PDP context modification is not completed, the evaluation act 760 is re-enacted.

Figure 8:
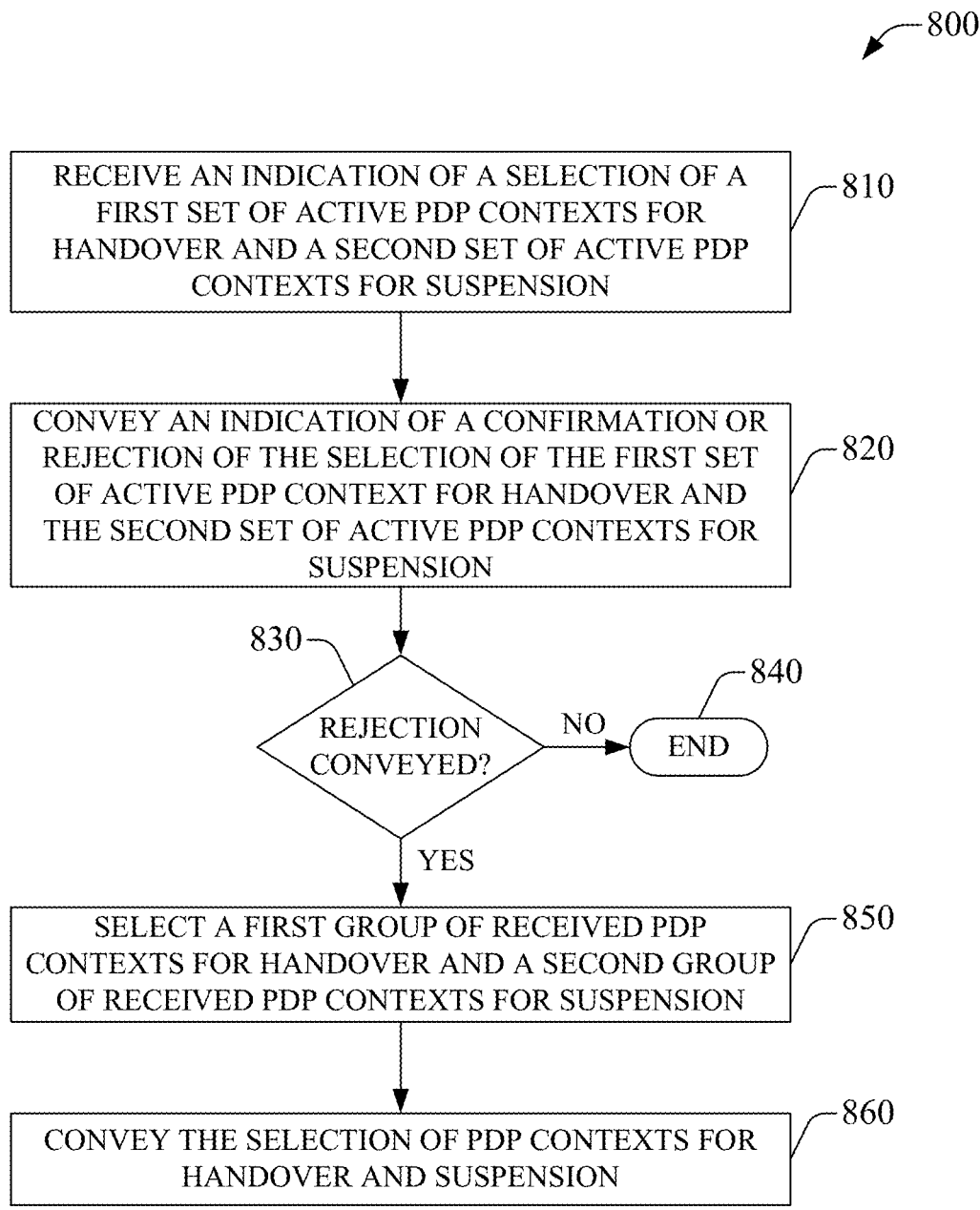
FIG. 8 is a flowchart of an example method for injecting subscriber input in management of PDP contexts during cellular-to-femto according to aspects of the subject application.

FIG. 8 is a flowchart of an example method for injecting subscriber input in management of PDP contexts during cellular-to-femto according to aspects described herein. It should be appreciated that example method can be enacted through a mobile station that undergoes the handover. At act 810, an indication of a selection of a first set of active PDP contexts for handover and a second set of active PDP contexts for suspension is received. In an aspect of the subject application, the indication prompts a subscriber that exploits the active PDP contexts through cellular network coverage to accept or reject the selection(s) of active PDP contexts to retain or suspend. Such indication can be embodied in a SMS communication, a multimedia message service (MMS) communication, a pop-up window(s), an instant message, and so on. The indication can be accompanied with aural indicia such as a ringtone, a vibration interval of a mobile station that receives the indication, and so forth. At act 820, an indication of either a confirmation or rejection of the selection of the first set of active PDP contexts for handover and the second set of active PDP contexts for suspension is conveyed. In an aspect, such indication is inputted by an end user of a mobile station that undergoes handover. At act 830, it is evaluated whether a rejection has been conveyed. In the negative case, example method 800 terminates at act 840. In the affirmative case, two groups of active PDP contexts are selected at act 850: a first group of received PDP contexts for handover, and a second group of received PDP contexts for suspension. At act 860, the selection of active PDP contexts for handover and suspension is conveyed. Delivery of the selection can be accomplished through a service base station, which is a part of the cellular RAN (see FIG. 2) utilized to provide cellular service.

It is to be noted that aspects, features, or advantages of the subject application described in the subject specification can be exploited in handover among substantially any pair of wireless communication technologies, such as Wi-Fi, WiMAX, Enhanced GPRS, 3GPP LTE, 3GPP2 UMB, 3GPP UMTS, HSPA, or Zigbee.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In addition, various aspects disclosed in the subject specification can be implemented through program modules stored in a memory (e.g., memory 230 or memory 288) and executed by a processor, or other combination of hardware and software, or hardware and firmware. Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disc (CD), digital versatile disc (DVD), Blu-ray disc (BD . . . ), smart cards, and flash memory devices (e.g., card, stick, key drive . . . ).

What has been described above includes examples of systems and methods that provide advantages of the subject application. It is, of course, not possible to describe every conceivable combination of components or methodologies for purposes of describing the subject application, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
    receiving, by a mobile device comprising a processor, an indication of a selection of a first set of active packet data protocol contexts and a second set of active packet data protocol contexts, wherein the first set is for a transfer from cellular network device coverage to femto network device coverage, wherein the second set is for suspension during the transfer and the active packet data protocol contexts in the second set are ranked for resumption in response to an active packet data protocol context from the first set being determined to have been terminated;
    presenting, by the mobile device, the selection;
    prompting, by the mobile device, for first user input confirming the selection; and
    in response to determining the first user input does not confirm the selection, prompting, by the mobile device, for second user input specifying a resume sequence of the active packet data protocol contexts of the second set to be performed in response to the active packet data protocol context from the first set being determined to have been terminated.

2. The method of claim 1, further comprising conveying, by the mobile device, data representative of the indication to another device that manages packet data protocol contexts.

3. The method of claim 1, further comprising conveying, by the mobile device, data representative of the resume sequence to another device that manages packet data protocol contexts.

4. The method of claim 1, further comprising, in response to determining the first user input confirms the selection and in response to the active packet data protocol context from the first set being determined to have been terminated, resuming, by the mobile device, an active packet data protocol context of the second set according to the ranking.

5. The method of claim 1, further comprising, in response to determining the first user input does not confirm the selection, receiving, by the mobile device, the second user input specifying the resume sequence.

6. The method of claim 5, further comprising, in response to determining the first user input confirms the selection and in response to the active packet data protocol context from the first set being determined to have been terminated, resuming, by the mobile device, an active packet data protocol context of the second set according to the resume sequence.

7. The method of claim 1, wherein the ranking of the active packet data protocol contexts of the second set is based on historical user input specifying previous active packet data protocol contexts for previous transfers received by the mobile device.

8. A mobile device, comprising:
    a processor; and
    a memory that stores executable instructions that, when executed by the processor, facilitate performance of operations, comprising:
        receiving an indication of a selection of a first set of active packet data protocol contexts and a second set of active packet data protocol contexts, wherein the first set of active packet data protocol contexts is for a transfer from cellular network device coverage to femto network device coverage, wherein the second set of active packet data protocol contexts is for suspension during the transfer, and wherein the active packet data protocol contexts of the second set are ranked for being resumed following suspension of an active packet data protocol context from the first set;
        displaying the selection;
        prompting for first user input confirming the selection; and
        in response to determining the first user input does not confirm the selection, prompting, by the mobile device, for second user input specifying a resume sequence of the active packet data protocol contexts of the second set to be performed following the suspension of the active packet data protocol context from the first set.

9. The mobile device of claim 8, the operations further comprising conveying the indication to a component that manages packet data protocol contexts.

10. The mobile device of claim 8, the operations further comprising conveying the resume sequence to a component that manages packet data protocol contexts.

11. The mobile device of claim 8, the operations further comprising, in response to determining the first user input confirms the selection and in response to the suspension of the active packet data protocol context from the first set, resuming at least one of the active packet data protocol contexts of the second set according to the ranking.

12. The mobile device of claim 8, the operations further comprising, in response to determining the first user input does not confirm the selection, receiving, by the mobile device, the second user input specifying the resume sequence.

13. The mobile device of claim 12, the operations further comprising, in response to determining the first user input confirms the selection and in response to the suspension of the active packet data protocol context from the first set, resuming at least one of the active packet data protocol contexts of the second set according to the resume sequence.

14. The mobile device of claim 8, wherein the ranking of the active packet data protocol contexts of the second set is further based on historical user input specifying previous active packet data protocol contexts for previous transfers received by the mobile device.

15. A non-transitory machine-readable storage medium, comprising executable instructions that, when executed by a processor, facilitate performance of operations, comprising:

receiving, by a wireless device comprising a processor, an indication of a selection of a first set of active packet data protocol contexts and a second set of active packet data protocol contexts, wherein the first set of active packet data protocol contexts is for a transfer from cellular network device coverage to femto network device coverage, wherein the second set of active packet data protocol contexts is for suspension during the transfer, and wherein the active packet data protocol contexts of the second set are ranked for being resumed following inactivation of an active packet data protocol context from the first set;

initiating, by the wireless device, a display of the selection;

prompting, by the wireless device, for first user input confirming the selection; and in response to determining the first user input does not confirm the selection, prompting, by the wireless device, for second user input specifying a resume sequence of the active packet data protocol contexts of the second set to be performed following the inactivation of the active packet data protocol context from the first set.

16. The non-transitory machine-readable storage medium of claim 15, the operations further comprising conveying, by the wireless device, the indication to a network device that manages packet data protocol contexts.

17. The non-transitory machine-readable storage medium of claim 15, the operations further comprising conveying, by the wireless device, the resume sequence to a network device that manages packet data protocol contexts.

18. The non-transitory machine-readable storage medium of claim 15, the operations further comprising, in response to determining the first user input confirms the selection and in response to the inactivation of the active packet data protocol context from the first set, resuming, by the wireless device, at least one of the active packet data protocol contexts of the second set according to the ranking.

19. The non-transitory machine-readable storage medium of claim 15, the operations further comprising, in response to determining the first user input does not confirm the selection, receiving, by the wireless device, the second user input specifying the resume sequence.

20. The non-transitory machine-readable storage medium of claim 19, the operations further comprising, in response to determining the first user input confirms the selection and in response to the inactivation of the active packet data protocol context from the first set, resuming, by the wireless device, at least one of the active packet data protocol contexts of the second set according to the resume sequence.

* * * * *